United States Patent
Young et al.

(10) Patent No.: US 7,235,950 B2
(45) Date of Patent: Jun. 26, 2007

(54) PROTECTION CIRCUIT LIMITING CURRENT APPLIED TO PERIPHERAL DEVICES

(75) Inventors: Sea-Weng Young, Pingtung (TW); Shao-Yu Wang, Taoyuan (TW)

(73) Assignee: Benq Corporation, Taoyuan (TW)

( * ) Notice: Subject to any disclaimer, the term of this patent is extended or adjusted under 35 U.S.C. 154(b) by 406 days.

(21) Appl. No.: 10/947,746

(22) Filed: Sep. 23, 2004

(65) Prior Publication Data

US 2005/0062459 A1    Mar. 24, 2005

(30) Foreign Application Priority Data

Sep. 23, 2003 (TW) .............................. 92126161 A

(51) Int. Cl.
*H01M 10/46* (2006.01)
(52) U.S. Cl. ..................................... 320/134
(58) Field of Classification Search ................ 320/107, 320/125, 134, 136
See application file for complete search history.

(56) References Cited

U.S. PATENT DOCUMENTS 5,225,763 A * 7/1993 Krohn et al. ................ 320/155
5,994,875 A * 11/1999 Lee ............................. 320/132

* cited by examiner

*Primary Examiner*—Edward H. Tso
(74) *Attorney, Agent, or Firm*—Thomas, Kayden, Horstemeyer & Risley

(57) ABSTRACT

The protection circuit for a power source of an electronic device capable of providing a certain range of current values to a peripheral unit comprising a power storage unit. The protection circuit comprises a first and second charging paths and a voltage detector. The voltage detector switches the first charging path to turn on the first switch, when the voltage value of the power storage unit 30 is lower than the threshold voltage, the power source can charge the power storage unit by the first switch, wherein the current limiting device limits the current value of first charging path to lower than a predetermined. The voltage detector switches the first charging path to breakup the second switch and the voltage detector switches to the first charging path to turn on the first switch.

21 Claims, 4 Drawing Sheets

PROTECTION CIRCUIT LIMITING CURRENT APPLIED TO PERIPHERAL DEVICES

BACKGROUND OF THE INVENTION

1. Field of the Invention

The invention relates to a protection circuit, and more specifically to a protection circuit capable of limiting a power source of an electronic device outputting a predetermined range of current for charging a peripheral unit.

2. Description of the Related Art

Electronic devices typically generate an excessive starting current and voltage, when connecting or disconnecting a peripheral component. These actions affect normal equipment operation and potentially damage the electronic devices.

Conventional protection circuits fabricated by separated components have drawbacks of low reliability and high cost for maintenance. To meet special application, many systems provide protection circuits for avoiding damages of ESD, surge current, overcurrent, undervoltage and overvoltage, and for carrying out current limiting to satisfy various requirements. Some protection circuits are for meeting special industry standards, such as UL, USB, IEEE, CSA or IEC. The protection circuits used for protecting equipments or operators typically have an adjustable current limiting function for avoiding equipment damages when plugging in or out peripheral components from the equipments. Surge current protection is the basic requirement for a current-limiting circuit to prevent surge current induced by a large capacitive load plugging in the equipment. Additionally, the current limiting function can also reduce the output of a power source to prevent generating arc when connecting a peripheral.

Examples of peripheral units for general communication used include global system for mobile card (GSM), general packet radio service card (GPRS), both devices require higher power for wireless transmission and therefore many large capacitive loads, for the power amplifiers to carry out wireless transmission, are built in the peripheral units. When a peripheral unit with large capacitive loads plugs in an electronic system such as a personal digital assistant, notebook or personal computer, the large capacitive loads may induce high charging current flowing from the power source installed in the electronic system to the peripheral unit and cause damages and instability.

Therefore, the invention provides a small fast inexpensive protection circuit. The protection circuit can additionally prevent high current, due to a short circuit.

SUMMARY OF THE INVENTION

The invention directs to a protection circuit for limiting a charging current, which is provided by a power source of an electronic device to a peripheral unit, in a predetermined range. The protection circuit prevents the power source from generating large current flowing to the peripheral unit when the peripheral unit connects the electronic device. Also, the protection circuit protecting the electronic device by limiting currents flowing to the peripheral unit to the predetermined range, even if the peripheral unit is damaged to short-circuit.

The invention achieves the above described objects by providing a protection circuit for an electronic device with a power source capable of providing a certain range of current to a peripheral unit. The peripheral unit comprises a power storage unit such as capacitive load, capacitor or battery and the protection circuit comprises a first charging path, a second charging path, and a voltage detector.

The first charging path disposed between the power source and the power storage unit, the first charging path limiting the current in a predetermined range. The second charging path disposed between the power source and the power storage unit. The voltage detector for detecting a voltage level of the power storage unit and selectively switches the first charging path and the second charging path to charge the power storage unit.

It is noted that when the voltage level of the power storage unit is lower than a threshold voltage, switching to the first charging path for the power source to charge the power storage unit; and when the voltage level of the power storage unit is higher or equal to the threshold voltage, switching to the second charging path for the power source to charge the power storage unit.

BRIEF DESCRIPTION OF THE DRAWINGS

The present invention can be more fully understood by reading the subsequent detailed description and examples with reference made to the accompanying drawings, wherein.

DETAILED DESCRIPTION OF THE INVENTION

First Embodiment

Figure 1:
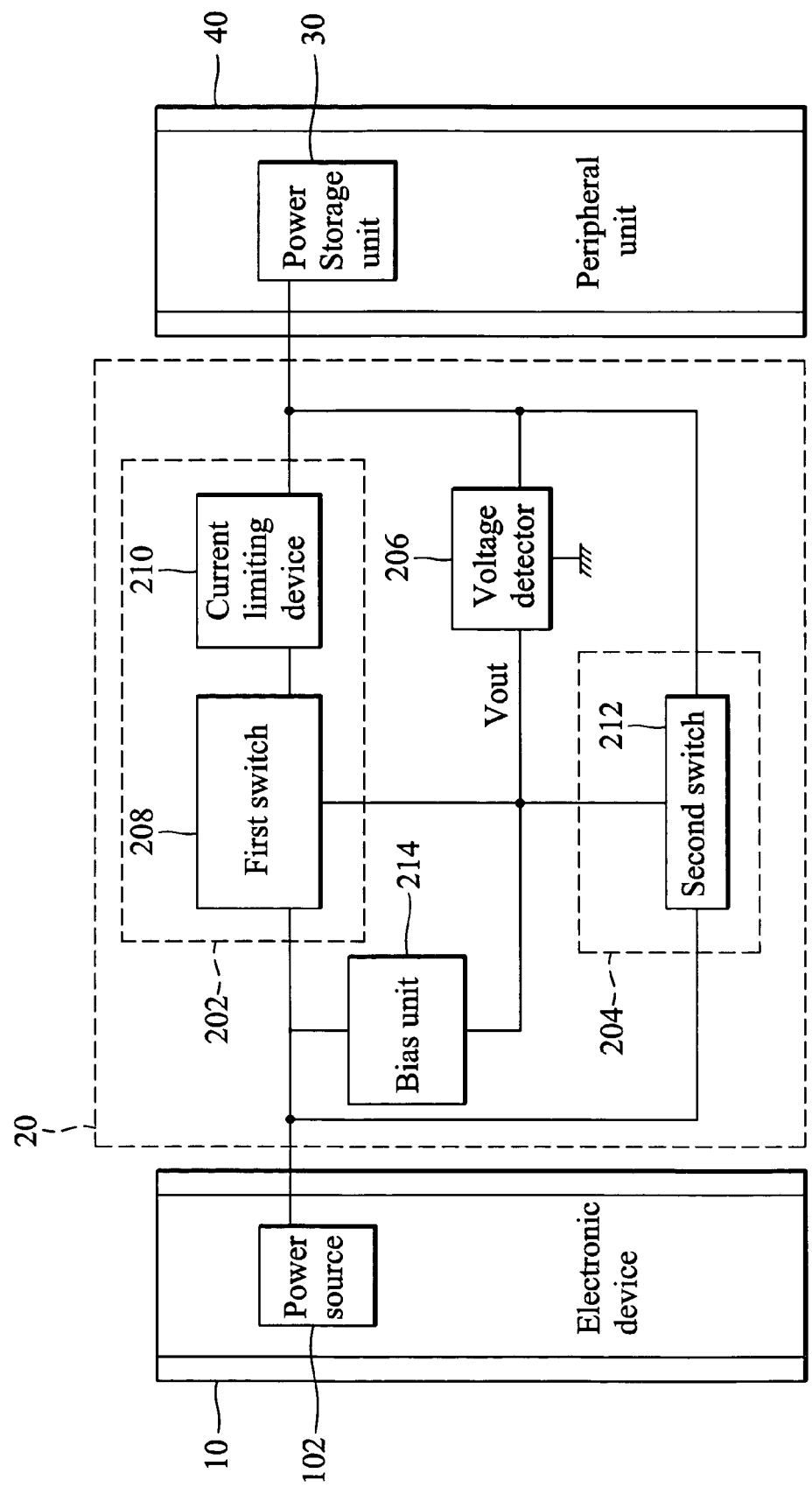
FIG. 1 shows a block diagram of a protection circuit 20 applied to an electronic device 10 and a peripheral unit 40, according to a first embodiment of the invention.

FIG. 1 shows a block diagram of a protection circuit 20 applied to an electronic device 10 and a peripheral unit 40, according to a first embodiment of the invention. FIG. 1 shows an electronic device 10 with a power source 102, a peripheral unit 40 having a power storage unit 30, and a protection circuit 20 coupled between the electronic device 10 and the peripheral unit 40. The protection circuit 20 comprises a first charging path 202 disposed between the power source 102 and the power storage unit 30, the second charging path 204 disposed between the power source 102 and the power storage unit 30, and the voltage detector 206 coupling to the power source 102 via a bias unit 214 and connecting the power storage unit 30. Wherein the first charging path 202 further comprises a first switch 208 and a current limiting device 210 and the second charging path 204 comprises a second switch 212.

Operation of the protection circuit 20 is described as follows.

The first charging path 202 works for limiting the charging current flowing therein in a predetermined range. The voltage detector 206 works for detecting a voltage level of the power storage unit 30. When the voltage level of the power storage unit 30 is lower than a threshold voltage, the voltage detector 206 switches on the first switch 208. Consequently, the power source 102 charges the power storage unit 30 through the first charging path 202 with a limited charging current limited to the predetermined range by the current limiting device 210. When the voltage level of the power storage unit 30 is higher than or equal to the threshold voltage, the voltage detector 206 switches on the second switch 212 for the power source 102 to charge the power storage unit 30.

For example, when a GSM/GPRS card (peripheral unit), generally with a power storage unit such as battery or large capacitor disposed inside, inserts to an electronic system such as a personal digital assistant, notebook or personal computer, the large capacitor may induce high charging current flowing from the power source installed in the electronic system to the GSM/GPRS card and cause damages and instability. The protection circuit according to the first embodiment detects the voltage level of the power storage unit (battery or large capacitor) and selectively switches the charging paths based on the voltage level to avoid occurrence of the high charging current thereby protecting and stabilizing the electronic system. Furthermore, the protection circuit according to the first embodiment prevents the peripheral unit (GSM/GPRS card) from producing a high current causing system instability or failure due to short circuit.

Second Embodiment

Figure 2:
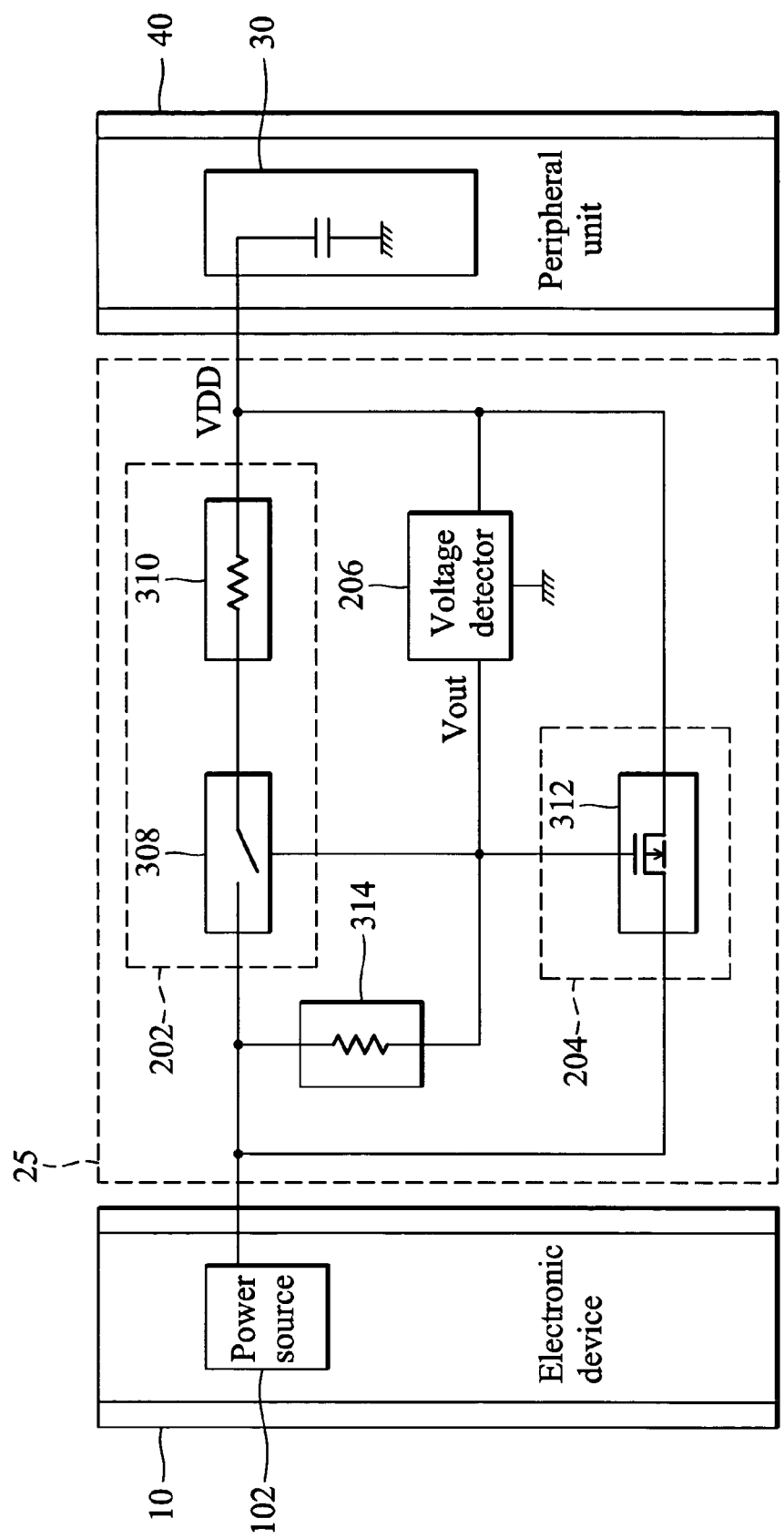
FIG. 2 shows a block diagram of a protection circuit 25 applied to an electronic device 10 and a peripheral unit 40, according to a second embodiment of the invention.

FIG. 2 shows a block diagram of a protection circuit 25 applied to an electronic device 10 and a peripheral unit 40, according to a second embodiment of the invention. In FIG. 2, the units similar with or equivalent to those shown in FIG. 1 are illustrated by the same notations. Structure of the protection circuit 25 is similar with the protection circuit 20 of FIG. 1 and is not described for brevity.

Operation of the protection circuit 25 is described as follows.

The voltage detector 206 is biased by the power source 102 via a resistor 314 to work for detecting a voltage level of the power storage unit 30 installed in the peripheral unit 40. In this embodiment, the power storage unit 30 is a capacitor. When the voltage level VDD of the power storage unit 30 is lower than a threshold voltage, the voltage detector 206 outputs a control signal Vout with a first logic level, for example high logic level, to switch on an analog switch 308 in the first charging path 202 and switch off a PMOS transistor 312 in the second charging path 202. Consequently, the power source 102 charges the power storage unit 30 through the analog switch 308 and a current-limiting resistor 310 (first charging path 202) with a limited charging current limited to the predetermined range by current-limiting resistor 310. When the voltage level VDD of the power storage unit 30 is higher than or equal to the threshold voltage, the voltage detector 206 outputs the control signal Vout with a second logic level, for example low logic level, to switch on the PMOS transistor 312 and switch off the analog switch 308, whereby the power source 102 charges the power storage unit 30 via the PMOS transistor 312 (second charging path 204).

Third Embodiment

Figure 3:
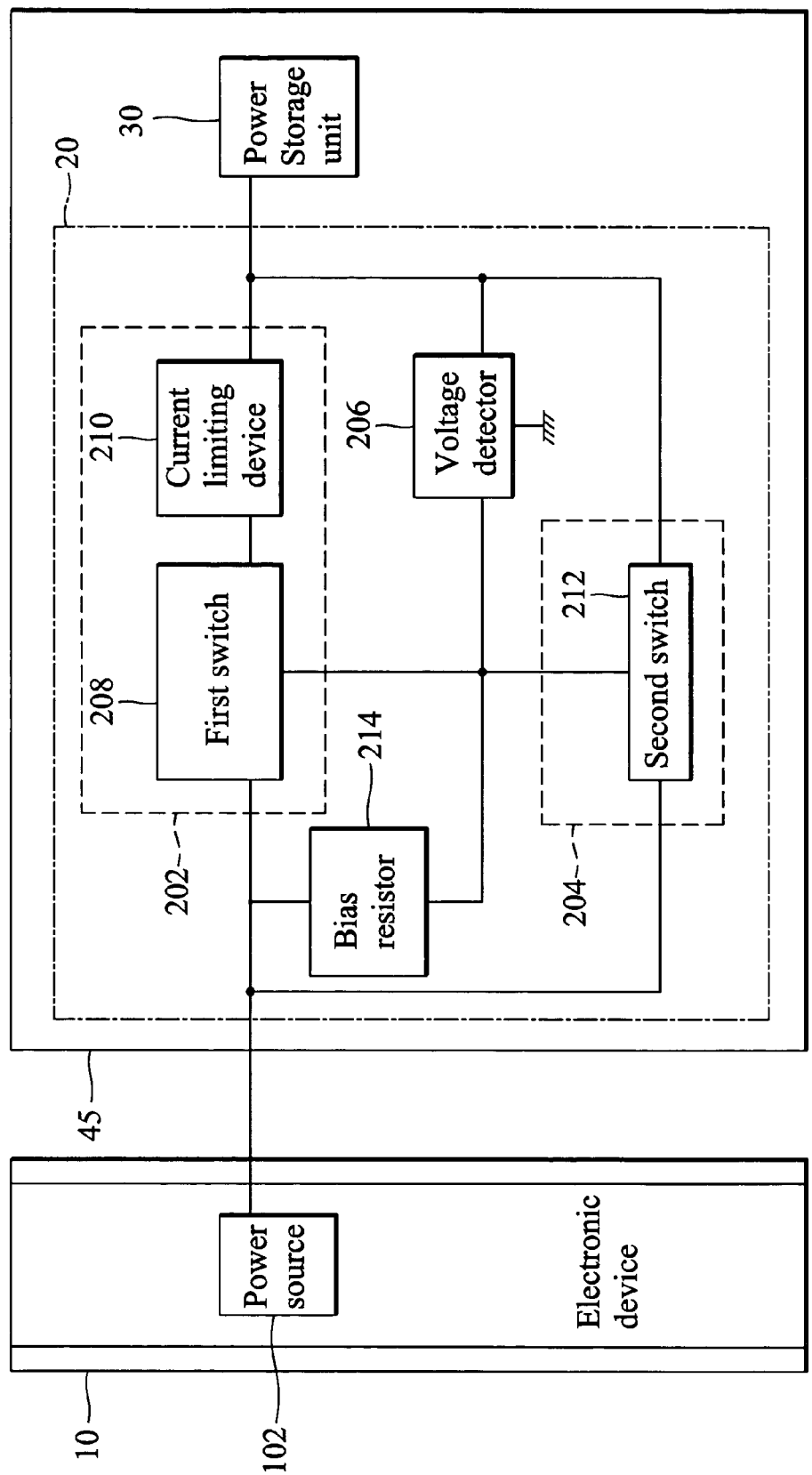
FIG. 3 shows a block diagram of a peripheral unit 45 with the protection circuit 20 described in the first embodiment.

FIG. 3 shows a block diagram of a peripheral unit 45 with the protection circuit 20 described in the first embodiment. The protection circuit 20 is installed in the peripheral unit 45 to avoid occurrence of the high charging current supplied from the power source thereby protecting and stabilizing the peripheral unit 45.

Fourth Embodiment

Figure 4:
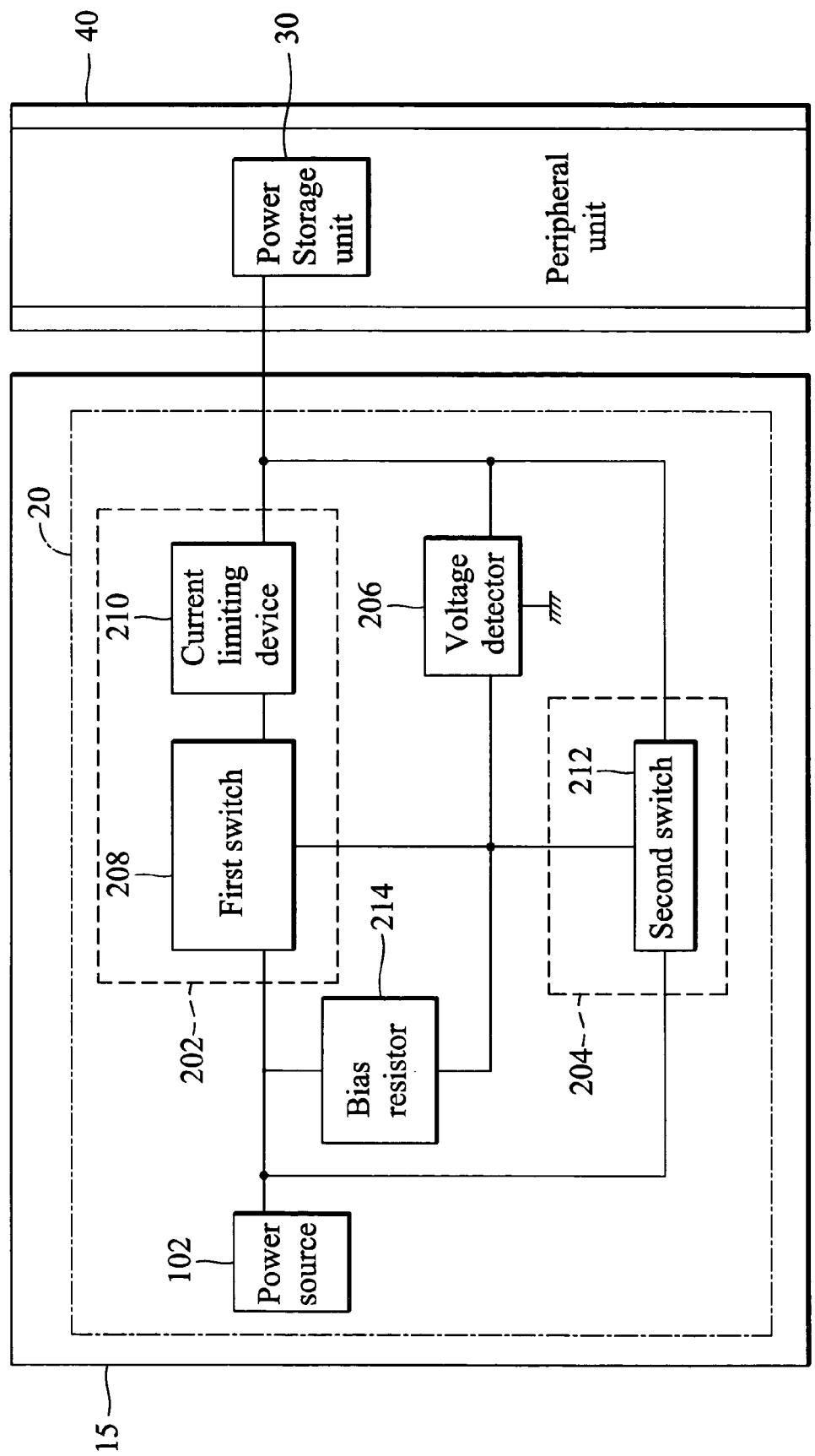
FIG. 4 shows a block diagram of an electronic device 15 with the protection circuit 20 described in the first embodiment.

FIG. 4 shows a block diagram of an electronic device 15 with the protection circuit 20 described in the first embodiment. The protection circuit 20 is installed in the electronic device 15 to avoid occurrence of the high charging current outputted from the power source 102 when the peripheral unit 40 connected to the electronic device 15, even if the power storage unit 30 is damaged or shorted, thereby protecting and stabilizing the electronic device 15.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A protection circuit for limiting a current in a predetermined range, the current provided to a peripheral unit by a power source of an electronic device, the peripheral unit having a power storage unit, the protection circuit comprising:
    a first charging path disposed between the power source and the power storage unit, the first charging path limiting the current in a predetermined range;
    a second charging path disposed between the power source and the power storage unit;
    a voltage detector for detecting a voltage level of the power storage unit and selectively switching the first charging path and the second charging path to charge the power storage unit;
    wherein when the voltage level of the power storage unit is lower than a threshold voltage, switching to the first charging path for the power source to charge the power storage unit;
    when the voltage level of the power storage unit is higher or equal to the threshold voltage, switching to the second charging path for the power source to charge the power storage unit.

2. The protection circuit as claimed in claim 1, the first charging path comprising:
    a first switch;
    a current limiting device;
    wherein when the voltage detector switches to the first charging path, the first switch turns on and the current limiting device limits the current of the first charging path lower than the predetermined range, and when the voltage detector switches to the second charging path, the first switch turns off.

3. The protection circuit as claimed in claim 2, wherein the current limiting device is a resistance.

4. The protection circuit as claimed in claim 2, the second charging path comprising:
    a second switch, when the voltage detector switching to the first charging path, the second switch turning off and the first switch turning on.

5. The protection circuit as claimed in claim 2, wherein the first switch is an analog switch.

6. The protection circuit as claimed in claim 4, wherein the second switch is a MOSFET.

7. The protection circuit as claimed in claim 6, wherein the MOSFET is a PMOS transistor.

8. A peripheral unit coupling to an electronic device, the electronic device having a power source, the power source providing a current to the peripheral unit, the peripheral unit comprising:
   a power storage unit having a voltage level;
   a protection circuit comprising:
   a first charging path disposed between the power source and the power storage, the first charging path limiting the current in a predetermined range;
   a second charging path disposed between the power source and the power storage unit;
   a voltage detector for detecting the voltage level of the power storage unit and selectively switching the first charging path and the second charging path to charge the power storage unit;
   wherein when the voltage level of the power storage unit is lower than a threshold voltage, switching to the first charging path for the power source charging the power storage unit via the first charging path;
   when the voltage level of the power storage unit is higher or equal to the threshold voltage, switching to the second charging path for the power source charging the power storage unit via the second charging path.

9. The peripheral unit as claimed in claim 8, the first charging path comprising:
   a first switch;
   a current limiting device;
   wherein when the voltage detector switches to the first charging path, the first switch turns on and the current limiting device limits the current of the first charging path lower than the predetermined range, and when the voltage detector switches to the second charging path, the first switch turning off.

10. The peripheral unit as claimed in claim 9, wherein the current limiting device is a resistance.

11. The peripheral unit as claimed in claim 9, the second charging path comprising:
   a second switch, when the voltage detector switches to the first charging path, the second switch turns off and the first switch turns on.

12. The peripheral unit as claimed in claim 9, wherein the first switch is an analog switch.

13. The peripheral unit as claimed in claim 11, wherein the second switch is a MOSFET.

14. The peripheral unit as claimed in claim 13, wherein the MOSFET is a PMOS transistor.

15. An electronic device coupling to a peripheral unit, the peripheral unit having a power storage unit, the electronic device comprising:
   a power source providing a current to the peripheral unit;
   a protection circuit comprising:
   a first charging path disposed between the power source and the power storage, the first charging path limiting the current in a predetermined range;
   a second charging path disposed between the power source and the power storage unit;
   a voltage detector for detecting a voltage level of the power storage unit and selectively switching the first charging path and the second charging path to charge the power storage unit;
   wherein when the voltage level of the power storage unit is lower than a threshold voltage, switching to the first charging path for the power source charging the power storage unit via the first charging path;
   when the voltage level of the power storage unit is higher or equal to the threshold voltage, switching to the second charging path for the power source charging the power storage unit via the second charging path.

16. The electronic device as claimed in claim 15, the first charging path comprising:
   a first switch;
   a current limiting device;
   wherein when the voltage detector switches to the first charging path, the first switch turns on and the current limiting device limits the current of the first charging path lower than the predetermined range, and when the voltage detector switches to the second charging path, the first switch turns off.

17. The electronic device as claimed in claim 16, wherein the current limiting device is a resistance.

18. The electronic device as claimed in claim 15, the second charging path comprising:
   a second switch, when the voltage detector switches to the first charging path, the second switch turns off and the first switch turns on.

19. The electronic device as claimed in claim 16, wherein the first switch is an analog switch.

20. The electronic device as claimed in claim 18, wherein the second switch is a MOSFET.

21. The electronic device as claimed in claim 20, wherein the MOSFET is a PMOS transistor.

* * * * *